(12) United States Patent
Mai et al.

(10) Patent No.: US 7,925,114 B2
(45) Date of Patent: Apr. 12, 2011

(54) SYSTEM AND METHOD FOR MOSAICING DIGITAL ORTHO-IMAGES

(75) Inventors: Tuy Vu Mai, Houston, TX (US); Chester L. Smitherman, Houston, TX (US)

(73) Assignee: Visual Intelligence, LP, Houston, TX (US)

( * ) Notice: Subject to any disclaimer, the term of this patent is extended or adjusted under 35 U.S.C. 154(b) by 0 days.

(21) Appl. No.: 12/462,563

(22) Filed: Aug. 5, 2009

(65) Prior Publication Data

US 2010/0020097 A1  Jan. 28, 2010

Related U.S. Application Data

(63) Continuation of application No. 11/128,656, filed on May 13, 2005, now Pat. No. 7,630,579, which is a continuation of application No. 10/247,441, filed on Sep. 19, 2002, now Pat. No. 6,928,194.

(51) Int. Cl.
    *G06K 9/36* (2006.01)
(52) U.S. Cl. ......... 382/284; 345/630; 345/634; 348/584
(58) Field of Classification Search .................. 382/284; 345/629–641; 348/584–588, 143–147
    See application file for complete search history.

(56) References Cited

U.S. PATENT DOCUMENTS

| | | | |
|---|---|---|---|
| 5,187,754 A | 2/1993 | Currin et al. .................. | 382/284 |
| 5,332,968 A | 7/1994 | Brown .......................... | 324/309 |
| 5,379,065 A | 1/1995 | Cutts ............................ | 348/269 |
| 5,894,323 A | 4/1999 | Kain et al. .................... | 348/116 |
| 5,963,664 A | 10/1999 | Kumar et al. ................. | 382/154 |
| 5,982,951 A | 11/1999 | Katayama et al. ............ | 382/284 |
| 6,005,987 A * | 12/1999 | Nakamura et al. ............ | 382/294 |
| 6,075,905 A | 6/2000 | Herman et al. ............... | 382/299 |
| 6,078,701 A | 6/2000 | Hsu et al. ..................... | 382/294 |
| 6,125,329 A | 9/2000 | Place et al. ........................ | 702/5 |
| 6,173,087 B1 | 1/2001 | Kumar et al. ................. | 382/284 |
| 6,393,163 B1 | 5/2002 | Burt et al. ..................... | 382/294 |
| 6,434,280 B1 | 8/2002 | Peleg et al. ................... | 382/299 |
| 6,570,612 B1 | 5/2003 | Saund et al. ................. | 348/218.1 |
| 6,597,818 B2 | 7/2003 | Kumar et al. ................. | 382/294 |
| 2002/0101438 A1 | 8/2002 | Ham et al. ..................... | 345/629 |
| 2002/0163582 A1 | 11/2002 | Gruber et al. ............. | 348/218.1 |
| 2003/0081827 A1 | 5/2003 | Paz-Pujalt et al. ............ | 382/152 |
| 2003/0169259 A1 | 9/2003 | Lavelle et al. ................ | 345/501 |
| 2003/0210336 A1 | 11/2003 | Khan et al. ................. | 348/231.3 |

OTHER PUBLICATIONS

Burt et al. "A Multiresolution Spline with Application to Image Mosiacs," ACM Transactions on Graphics, vol. 2, No. 4, Oct. 1983, pp. 217-236.

(Continued)

*Primary Examiner* — Aaron W Carter
(74) *Attorney, Agent, or Firm* — Jennifer S. Sickler; Teresa Lechner-Fish; Gardere Wynne Sewell LLP

(57) ABSTRACT

The present invention provides a system and method for mosaicing multiple input images, captured by one or more remote sensors, into a seamless mosaic of an area of interest. Each set of input images captured by the remote sensors within a capture interval are ortho-rectified and mosaiced together into a composite image. Successive composite images, along a given flight path, are then mosaiced together to form a strip. Adjacent strips are then mosaiced together to form a final image of the area of interest.

4 Claims, 10 Drawing Sheets

OTHER PUBLICATIONS

USPTO Office Action Mailed on Mar. 3, 2009 in U.S. Appl. No. 11/128,656.
USPTO Office Action Mailed on Jul. 17, 2008 in U.S. Appl. No. 11/128,656.
USPTO Office Action Mailed on Jun. 7, 2007 in U.S. Appl. No. 11/128,656.
USPTO Office Action Mailed on Nov. 20, 2006 in U.S. Appl. No. 11/128,656.

* cited by examiner

SYSTEM AND METHOD FOR MOSAICING DIGITAL ORTHO-IMAGES

CROSS-REFERENCES TO RELATED APPLICATIONS

This application is a continuation of the following U.S. patent application Ser. No. 11/128,656, filed May 13, 2005, now U.S. Pat. No. 7,630,579, issued Dec. 8, 2009, which is a continuation of U.S. application Ser. No. 10/247,441, filed Sep. 19, 2002, now U.S. Pat. No. 6,928,194, issued Aug. 9, 2005.

TECHNICAL FIELD OF THE INVENTION

The present invention relates, generally, to the field of remote imaging techniques and, more particularly, to a system for rendering high-resolution digital images over very large fields of view.

BACKGROUND OF THE INVENTION

Remote imaging is a broad-based technology having a number of diverse and extremely important practical applications—such as geological mapping and analysis, military surveillance and planning, and meteorological forecasting. Aerial and satellite-based photography and imaging are especially useful remote imaging techniques that have, over recent years, become heavily reliant on the collection and processing of digital image data. Spatial data—characterizing real estate improvements and locations, roads and highways, environmental hazards and conditions, utilities infrastructures (e.g., phone lines, pipelines), and geophysical features—can now be collected, processed, and communicated in a digital format to conveniently provide highly accurate mapping and surveillance data for various civilian and military applications (e.g., dynamic GPS mapping).

A major challenge facing some such remote imaging applications is one of image resolution. Certain applications require very high image resolution—often with tolerances of inches. Depending upon the particular system used (e.g., aircraft, satellite, or space vehicle), an actual digital imaging device may be located anywhere from several hundred feet to several miles above its target, resulting in a very large scale factor. Providing images with very large scale factors, that also have resolution tolerances of inches, poses a challenge to even the most robust imaging system. Thus, conventional systems usually must make some trade-off between resolution quality and the size of a target area that can be imaged. If the system is designed to provide high-resolution digital images, then the field of view (FOV) of the imaging device is typically small. If the system provides a larger FOV, then usually the resolution of the digital image is decreased and the distortion is increased.

Ortho-imaging is one approach that has been used in an attempt to address this problem. In general, ortho-imaging renders a composite image of a target by compiling varying sub-images of the target. Typically, in aerial imaging applications, a digital imaging device that has a finite range and resolution records images of fixed subsections of a target area sequentially. Those images are then aligned according to some sequence to render a composite of a target area.

Often, such rendering processes are very time-consuming and labor intensive. In many cases, those processes require iterative processing that measurably degrades image quality and resolution—especially in cases where thousands of sub-images are being rendered. In cases where the imaging data can be processed automatically, that data is often repetitively transformed and sampled—reducing color fidelity and image sharpness with each successive manipulation. If automated correction or balancing systems are employed, such systems may be susceptible to image anomalies (e.g., unusually bright or dark objects)—leading to over or under-corrections and unreliable interpretations of image data. In cases where manual rendering of images is required or desired, time and labor costs are immense.

There is, therefore, a need for an ortho-image rendering system that provides efficient and versatile imaging for very large FOVs while maintaining image quality and clarity.

SUMMARY OF THE INVENTION

The present invention provides a versatile system for efficiently and reliably stitching together images, collected from high-resolution digital imaging sensors, into a seamless, high quality, wide FOV mosaic image. The mosaicing processes of the present invention efficiently stitch thousands of small, digital sub-images into a single, high-quality composite image. The present invention provides processes that tonally balance images based on green-dominant pixels, providing greater image fidelity and clarity even where image anomalies occur. The present invention transforms original sub-images only once during generation of the final mosaic—reducing processing time and image distortions due to iterative manipulations.

More specifically, the present invention provides a system for mosaicing two overlapping digital input images together. One input image, comprising a number of pixels having certain intensity, is identified as the reference image. A second input image, also comprising a number of pixels having certain intensity, overlaps the reference image in an overlap area. The pixels of the secondary image within the overlap area are scaled to have intensity equivalent to the intensity of the reference image pixels within the overlapping area.

The present invention also provides a system for rendering multiple input images into a single composite image. This system comprises a first sub-system for determining geographical boundaries of each input image. A second sub-system, for mapping each input image into the composite image with accurate geographical position, is cooperatively engaged with the first sub-system. A third sub-system for balancing color of the input images mapped into the composite image is cooperatively engaged with the first and second sub-systems. Finally, a fourth sub-system for blending borders between adjacent input images mapped into the composite image is cooperatively engaged with the first, second and third sub-systems.

In addition, the present invention provides a method of geographically aligning a plurality of input images of a target terrain collected from an imaging sensor. The imaging sensor's attitude with respect to a target terrain is determined. A primary input image and at least one secondary image are provided or identified. The primary input image is aligned with respect to the target terrain, and the secondary input image is aligned with respect to the primary input image.

The present invention further provides a system for rendering multiple, partially-overlapping input images of a target terrain, taken successively along a flight line over the target terrain, into a seamless image strip of the target terrain. That system comprises a sub-system for providing a reference image and a secondary image that partially overlap and have a common boundary area. Another subsystem divides the boundary area into segments. Another subsystem computes a balancing correlation matrix for each such segment. The system also comprises a subsystem for modifying pixel values within each segment, along a gradient that starts at the image boundary and terminates at a predetermined transition distance, by the balancing correlation matrix for that segment. The system also comprises a subsystem for providing smooth transition from the balancing correlation matrix of one segment to the next by defining a transition area at the interface between two segments and using distance-weighted average values of the two corresponding matrices to scale pixels in this area. Finally, another subsystem feathers pixels at the boundary to eliminate any remaining visible seam.

In addition, the present invention also provides a method of establishing a seam line between adjacent image strips that minimizes perspective imaging effects of elevated features in the image strips. An initial seam line between the image strips is selected. The initial seam line is divided into small segments. The position of an elevated feature in a particular segment is determined; and the route of the seam line in that segment is then altered based on the position of the elevated feature.

The present invention also provides a method for rendering multiple, partially-overlapping input image strips of a target terrain into a seamless image mosaic of the target terrain that includes normalizing the intensity of each input image to a desired mean and standard deviation. A reference image and a secondary image, having a partially overlapping area and a common boundary area are provided. A segmented seam line between the reference and secondary image strips, that minimizes perspective imaging effects of elevated features in those images, is established. The boundary area is divided into segments corresponding to the segments of the seam line. A balancing correlation matrix is computed for each such segment. Pixel values are modified within each segment, along a gradient that starts at the boundary and terminates at a predetermined transition distance, by the balancing correlation matrix for that segment. The system also comprises a subsystem for providing smooth transition from the balancing correlation matrix of one segment to the next by defining a transition area at the interface between two segments and using distance-weighted average values of the two corresponding matrices to scale pixels in this area. The pixels at the boundary are further feathered to eliminate any remaining visible seam.

The present invention further provides a method of processing color input images to reduce bias caused by man-made structures or water bodies. The method includes selecting green-dominant pixels from a first input image and computing an average intensity value thereof. Green-dominant pixels are then selected from a second input image, and an average intensity value thereof is computed. The average intensity values of the first and second input images are then compared, and the first or second input image is processed responsive to the results of the comparison.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

The present invention provides a versatile system for efficiently and reliably stitching together images, collected from high-resolution digital imaging sensors, into a seamless, high quality, mosaic image covering a wide FOV. The mosaicing processes of the present invention efficiently stitch (or mosaic) thousands of small, digital sub-images into a single, high-quality composite image. Processing the image data in digital format provides greater efficiency and lowers processing costs. The present invention provides processes that tonally balance images based on green-dominant pixels, providing greater image fidelity and clarity—even where image anomalies, such as exceptionally bright or dark objects, occur. Moreover, the present invention transforms original sub-images only once during the mosaicing process—reducing processing time and image distortions due to iterative manipulations.

As previously indicated, the present invention mosaics images collected from high-resolution digital imaging sensors. The teachings and principles of the present invention are applicable to a wide variety of digital imaging systems and sensors, relying on a number of equipment and platform configurations. For purposes of explanation and illustration, however, the present invention is hereafter described in reference to one particular embodiment of a scalable camera array for remote imaging. It should be understood, however, that those of skill in the art will, upon reference to this description, be able to apply the principles and teachings of the present invention in a wide variety of imaging systems—from personal digital cameras to satellites and other spacecraft-based surveillance systems.

Figure 1:
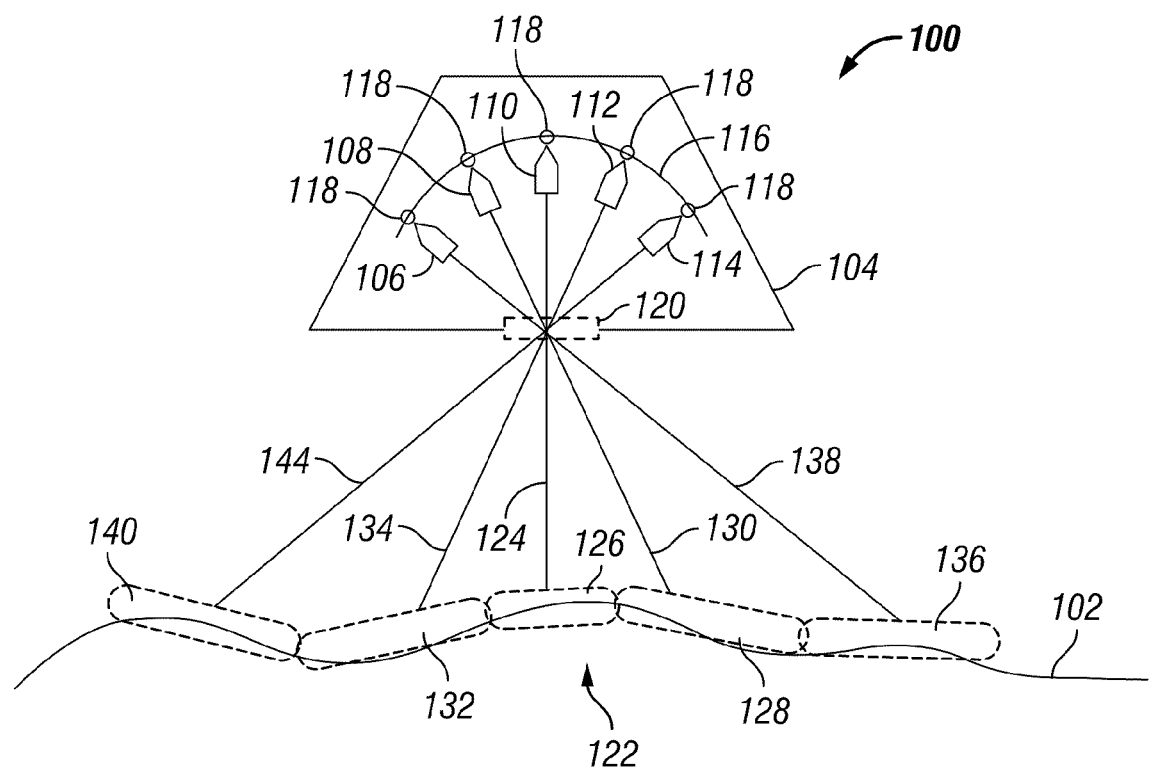
FIG. 1 illustrates an imaging sensor in accordance with certain aspects of the present invention.

Referring now to FIG. 1, one embodiment of a high-resolution digital imaging sensor, which may be used to collect image data according to the present invention, is illustrated. FIG. 1 depicts a camera array assembly 100 airborne over target 102 (e.g., terrain). For illustrative purposes, the relative size of assembly 100, and the relative distance between it and terrain 102, are not depicted to scale in FIG. 1. Assembly 100 comprises a housing 104 within which imaging sensors 106, 108, 110, 112 and 114 are disposed along a concave curvilinear axis 116. The radius of curvature of axis 116 may vary or be altered dramatically, providing the ability to effect very subtle or very drastic degrees of concavity in axis 116. Alternatively, axis 116 may be completely linear—having no curvature at all. Imaging sensors 106, 108, 110, 112 and 114 couple to housing 104, either directly or indirectly, by attachment members 118. Attachment members 118 may comprise a number of fixed or dynamic, permanent or temporary, connective apparatus. For example, members 118 may comprise simple welds, removable clamping devices, or electro-mechanically controlled universal joints.

As depicted in FIG. 1, housing 104 comprises a simple enclosure inside of which sensors 106, 108, 110, 112 and 114 are disposed. Sensors 106-114 couple, via members 118, either collectively to a single transverse cross member, or individually to lateral cross members disposed between opposing walls of housing 104. In alternative embodiments, housing 104 may itself comprise only a supporting cross member of concave curvature to which sensors 106-114 couple, via members 118. In other embodiments, housing 104 may comprise a hybrid combination of enclosure and supporting cross member. Housing 104 further comprises an aperture 120 formed in its surface, between the sensors and target 102. Depending upon the specific type of host craft, aperture 120 may comprise only a void, or it may comprise a protective screen or window to maintain environmental integrity within housing 104. Optionally, aperture 120 may comprise a lens or other optical device to enhance or alter the nature of the images recorded by the sensors. Aperture 120 is formed with a size and shape sufficient to provide sensors 106-114 proper lines of sight to a target region 122 on terrain 102.

Sensors 106-114 are disposed within or along housing 104 such that the focal axes of all sensors converge and intersect each other within an intersection area bounded by aperture 120. Depending upon the type of image data being collected, the specific sensors used, and other optics or equipment employed, it may be necessary or desirable to offset the intersection area or point of convergence above or below aperture 120. Sensors 106-114 are separated from each other at angular intervals, which are preferably equal. The exact angle of displacement between the sensors may vary widely depending upon the number of sensors utilized and on the type of imaging data being collected. The angular displacement between sensors may also be unequal, if required, so as to provide a desired image offset or alignment. Depending upon the number of sensors utilized, and the particular configuration of the array, the focal axes of all sensors may intersect at exactly the same point, or may intersect at a plurality of points, all within close proximity to each other and within the intersection area defined by aperture 120.

As depicted in FIG. 1, sensor 110 is centrally disposed within housing 104 along axis 116. Sensor 110 has a focal axis 124, directed orthogonally from housing 104 to align the sensor's line of sight with image area 126 of region 122. Sensor 108 is disposed within housing 104 along axis 116, adjacent to sensor 110. Sensor 108 is aligned such that its line of sight coincides with image area 128 of region 122, and such that its focal axis 130 converges with and intersects axis 124 within the area bounded by aperture 120. Sensor 112 is disposed within housing 104 adjacent to sensor 110, on the opposite side of axis 116 as sensor 108. Sensor 112 is aligned such that its line of sight coincides with image area 132 of region 122, and such that its focal axis 134 converges with and intersects axes 124 and 130 within the area bounded by aperture 120. Sensor 106 is disposed within housing 104 along axis 116, adjacent to sensor 108. Sensor 106 is aligned such that its line of sight coincides with image area 136 of region 122, and such that its focal axis 138 converges with and intersects the other focal axes within the area bounded by aperture 120. Sensor 114 is disposed within housing 104 adjacent to sensor 112, on the opposite side of axis 116 as sensor 106. Sensor 114 is aligned such that its line of sight coincides with image area 140 of region 122, and such that its focal axis 144 converges with and intersects the other focal axes within the area bounded by aperture 120.

Sensors 106-114 may comprise a number of digital imaging devices including, for example, individual cameras, infrared sensors, or seismic sensors. Each sensor may comprise an individual imaging device, or may itself comprise an imaging array. Sensors 106-114 may all be of a homogenous nature, or may comprise a combination of varied imaging devices. For ease of reference, sensors 106-114 are hereafter referred to as cameras 106-114, respectively.

In large-format film or digital cameras, lens distortion is typically a source of imaging problems. Each individual lens must be carefully calibrated to determine precise distortion factors. In one embodiment of this invention, small-format digital cameras—having lens angles of 14 degrees or smaller—are utilized. This alleviates noticeable distortion efficiently and affordably.

Cameras 106-114 are alternately disposed within housing 104 along axis 116 such that each camera's focal axis converges upon aperture 120, crosses focal axis 124, and aligns its field of view with a target area opposite its respective position in the array—resulting in a "cross-eyed", retinal relationship between the cameras and the imaging target(s). Assembly 100 is configured such that adjoining borders of image areas 126, 128, 132, 136 and 140 overlap slightly.

If members 118 are of a permanent and fixed nature (e.g., welds), then the spatial relationship between aperture 120, the cameras, and their lines of sight remain fixed—as will the spatial relationship between image areas 126, 128, 132, 136 and 140. Such a configuration may be desirable in, for example, a satellite surveillance application where assembly 100 will remain at an essentially fixed distance from region 122. The position and alignment of the cameras is set such that areas 126, 128, 132, 136 and 140 provide full imaging coverage of region 122. If members 118 are of a temporary or adjustable nature, however, it may be desirable to selectively adjust, either manually or by remote automation, the position or alignment of the cameras so as to shift, narrow or widen areas 126, 128, 132, 136 and 140—thereby enhancing or altering the quality of images collected by assembly 100.

Camera 110 is designated as the principal camera. The image plane 126 of camera 110 serves as a plane of reference. The orientations of the other cameras 106, 108, 112 and 114 are measured relative to the plane of reference. The relative orientations of each camera are measured in terms of the yaw, pitch and roll angles required to rotate the image plane of the camera to become parallel to the plane of reference. The order of rotations is roll, pitch and yaw.

Figure 2:
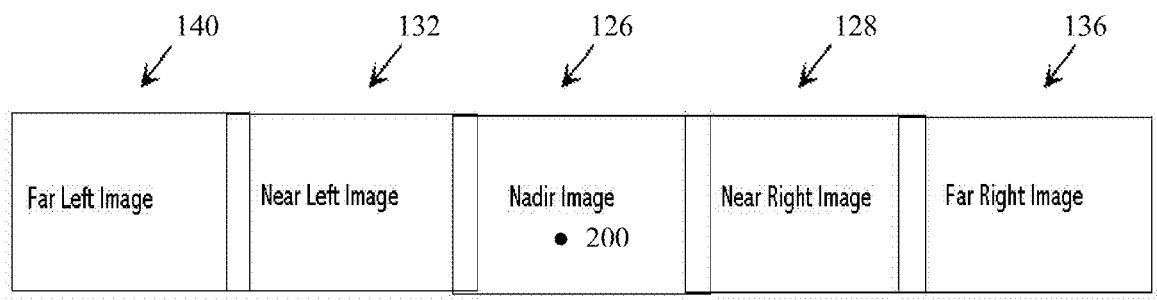
FIG. 2 illustrates one embodiment of an imaging pattern retrieved by the sensor of FIG. 1.

Referring now to FIG. 2, images of areas 136, 128, 126, 132 and 140 taken by cameras 106-114, respectively, are illustrated from an overhead view. Again, because of the "cross-eyed" arrangement, the image of area 136 is taken by camera 106, the image of area 140 is taken by camera 114, and so on. In one embodiment of the present invention, images other than those taken by the center camera 110 take on a trapezoidal shape after perspective transformation. Cameras 106-114 form an array along axis 116 that is, in most applications, pointed down vertically. In an alternative embodiment, a second array of cameras, configured similar the array of cameras 106-114, is aligned with respect to the first array of cameras to have an oblique view—providing a "heads-up" perspective. Other alternative embodiments, varying the mounting of camera arrays, are similarly comprehended by the present invention. In all such embodiments, the relative positions and attitudes of the cameras are precisely measured and calibrated so as to facilitate image processing in accordance with the present invention.

In one embodiment of the present invention, an external mechanism (e.g., a GPS timing signal) is used to trigger the cameras simultaneously—capturing an array of input images. A compound image module (or "mosaicing module", as referred to hereafter) then renders the individual input images from such an array into an ortho-rectified compound image (or "mosaic"), without any visible seams between the adjacent images. The mosaicing module performs a set of tasks comprising: determining the geographical boundaries and dimensions of each input image; projecting each input image onto the mosaic with accurate geographical positioning; balancing the color of the images in the mosaic; and blending adjacent input images at their shared seams. The exact order of the tasks performed may vary, depending upon the size and nature of the input image data. The mosaicing module performs only a single transformation to an original input image during mosaicing. That transformation can be represented by a 4×4 matrix. By combining multiple transformation matrices into a single matrix, processing time is reduced and original input image sharpness is retained.

During mapping of the input images to the mosaic, especially when mosaicing is performed at high resolutions, some pixels in the mosaic (i.e., output pixels) may not be mapped to by any pixels in the input images (i.e., input pixels). Warped lines could potentially result as artifacts in the mosaic. The present invention overcomes this with a super-sampling system, where each input and output pixel is further divided into an n×m grid of sub-pixels. Transformation is performed from sub-pixels to sub-pixels. The final value of an output pixel is the average value of its sub-pixels for which there is a corresponding input sub-pixel. Larger n and m values produce mosaics of higher resolution, but do require extra processing time.

During its processing of image data, the mosaicing module utilizes the following information: the spatial position (e.g., x, y, z coordinates) of each camera's focal point at the time an input image is captured; the attitude (i.e., yaw, pitch, roll) of each camera's image plane relative to the target region's ground plane at the time an input image was captured; each camera's fields of view (i.e., along track and cross track); and the Digital Elevation Model (DEM) of the area.

A camera's focal point is used as a perspective transformation center. Its position in space is determined, for example, by a dual-frequency carrier phase post-processed GPS system mounted on the host craft. The offsets, in three dimensions, of a camera's focal point must be carefully measured against the center of the GPS antenna. These offsets are combined with the position of the GPS antenna, and the orientation of the host craft, to determine the exact position of the camera's focal point. The position of the GPS antenna is determined by post-flight processing of collected GPS data against similar ground-based GPS antennas deployed at precisely surveyed points.

An Inertial Measurement Unit (IMU) (e.g., the Applanix POS AV) is mounted onboard for attitude determination. The attitude of the IMU reference plane relative to the target region's ground plane is measured and recorded at short intervals, with accuracy better than one-hundredth of one degree. The attitude of the IMU reference plane is defined as the series of rotations that can be performed on the axes of this plane to make it parallel to the ground plane. The term "align" is also used to describe this operation.

The attitude of center camera 110 (i.e. its image plane), relative to the IMU, must be carefully calibrated. The attitude of each of the other cameras, relative to center camera 110, must also be carefully calibrated. This dependent calibration is more efficient than directly calibrating each camera. When the camera array is remounted, only center camera 110 needs to be recalibrated. Effectively, a series of two transformations is applied to an input image from center camera 110. First, the center camera's image plane is aligned to the IMU plane. Then, the IMU plane is aligned again to the ground plane. These transformations, however, combine into a single operation by multiplying their respective transformation matrices. For image from each of the other cameras, an additional transformation is first performed to align it with the center camera's image plane.

The position of the focal point of center camera 110 is determined as described above. The x and y components of this position determine the position of the mosaic's nadir point 200 on the ground. Field of view (FOV) angles of each camera are known, thus the dimensions of each input image can be determined by the z component of that camera's focal point. An average elevation of the ground is determined by computing the average elevation of points in the DEMs of the area, and then each input image is projected to an imaginary horizontal plane at this elevation. Relief displacement is then applied using the DEMs of the area. The DEMs can be obtained from many sources including: the USGS 30- or 10-meter DEMs available for most of the US; commercial DEMs; or DEMs obtained by a LIDAR device mounted on the host craft that captures data concurrently with the cameras.

Besides being geographically correctly placed, the resulting compound image also needs to have color consistency throughout, and no visible seams at the joints between two adjacent images. The present invention provides a number of techniques achieving this goal.

A characteristic of a conventional camera is the exposure time (i.e., the time the shutter is open to collect light onto the image plane). The longer the exposure time, the lighter the resultant image becomes. Exposure time must adapt to changes in ambient lighting caused by conditions such as: cloud coverage; the angle and position of the sun relative to the camera; and so forth. Optimal exposure time may also depend on a camera's orientation with respect to lighting sources (e.g., cameras pointing towards a sunlit object typically receive more ambient light than those pointing towards a shaded object). Exposure time is adjusted to keep the average intensity of an image within a certain desired range. For example, in 24-bit color images each Red, Green and Blue component can have intensity values from 0 to 255. In most instances, however, it is desirable to keep the average intensity at a mean value (i.e., 127).

In the present invention, an exposure control module controls exposure time for each of the cameras or imaging sensors. It examines each input image and calculates average image intensity. Based on a moving average (i.e., average intensity of the last X number of images), the exposure control module determines whether to increase or decrease exposure time. The module can use a longer running average to effect a slower reaction to changes in lighting conditions, with less susceptibility to unusually dark or light images (e.g., asphalt roads or water). The exposure control module controls exposure time for each camera separately.

In systems where cameras are mounted without forward-motion compensation mechanisms, there must be a maximum limit for exposure time. Setting exposure time to a value larger than the maximum may cause motion-induced blurriness. For example, assume cameras are mounted on an airplane traveling at 170 miles/hour (or about 3 inches/ms). Assume desired pixel resolution is 6 inches. Forward motion during image capture should be limited to half a pixel size—which in this case equals 3 inches. Thus, maximum exposure time is 1 millisecond.

In controlling imaging quality, it is useful to be able to determine if changes in light intensity are caused either due to a change in ambient light or due to the presence of unusually light or dark objects (e.g., reflecting water body, metal roofs, asphalts, etc.). Certain applications of this invention involve aerial photography or surveillance. It is observed that aerial images of the ground usually contain plants and vegetation—which have more consistent reflectivity than water bodies or man-made structures such as roads and buildings. Of course, images of plants and vegetation are usually green-dominant (i.e., the green component is the greatest of the red, green and blue values). Therefore, intensity correlation can be made more accurate by focusing on the green-dominant pixels.

The exposure control module computes the average intensity of an image by selecting only green-dominant pixels. For example, if an image has 1 million pixels and 300,000 are green-dominant, only those 300,000 green-dominant pixels are included in the calculation of average intensity. This results in an imaging process that is less susceptible to biasing caused by man-made structures and water bodies, whose pixels are usually not green-dominant. As previously noted, it is desirable to maintain an intensity value of about 127. When intensity value is over 127 (i.e., over-exposed), exposure time is reduced so that less light is captured. Similarly, when intensity value is under 127 (i.e., under-exposed), exposure time is increased so that more light is captured. For example, consider a system flying over a target terrain area having many white roofs, whose intensities are very high. Average intensity for the images captured would tend to be high. In most conventional systems, exposure time would by reduced in order to compensate. In such an example, however, reducing exposure time is not proper, because the average intensity of the images has been biased by the bright roofs. Reducing exposure time would result in images where the ground is darker than it should be. In contrast, if only green-dominant pixels are processed in accordance with the present invention, then pixels representing the overly bright roofs are excluded and do not bias the average intensity, and the exposure time is not changed.

Thus, the exposure control module reduces intensity differences between input images. Nonetheless, further processing is provided to enhance tonal balance. There are a number of factors (e.g., lens physics, atmospheric conditions, spatial/positional relationships of imaging devices) that cause an uneven reception of light from the image plane. More light is received in the center of a camera or sensor than at the edges.

Figure 3:
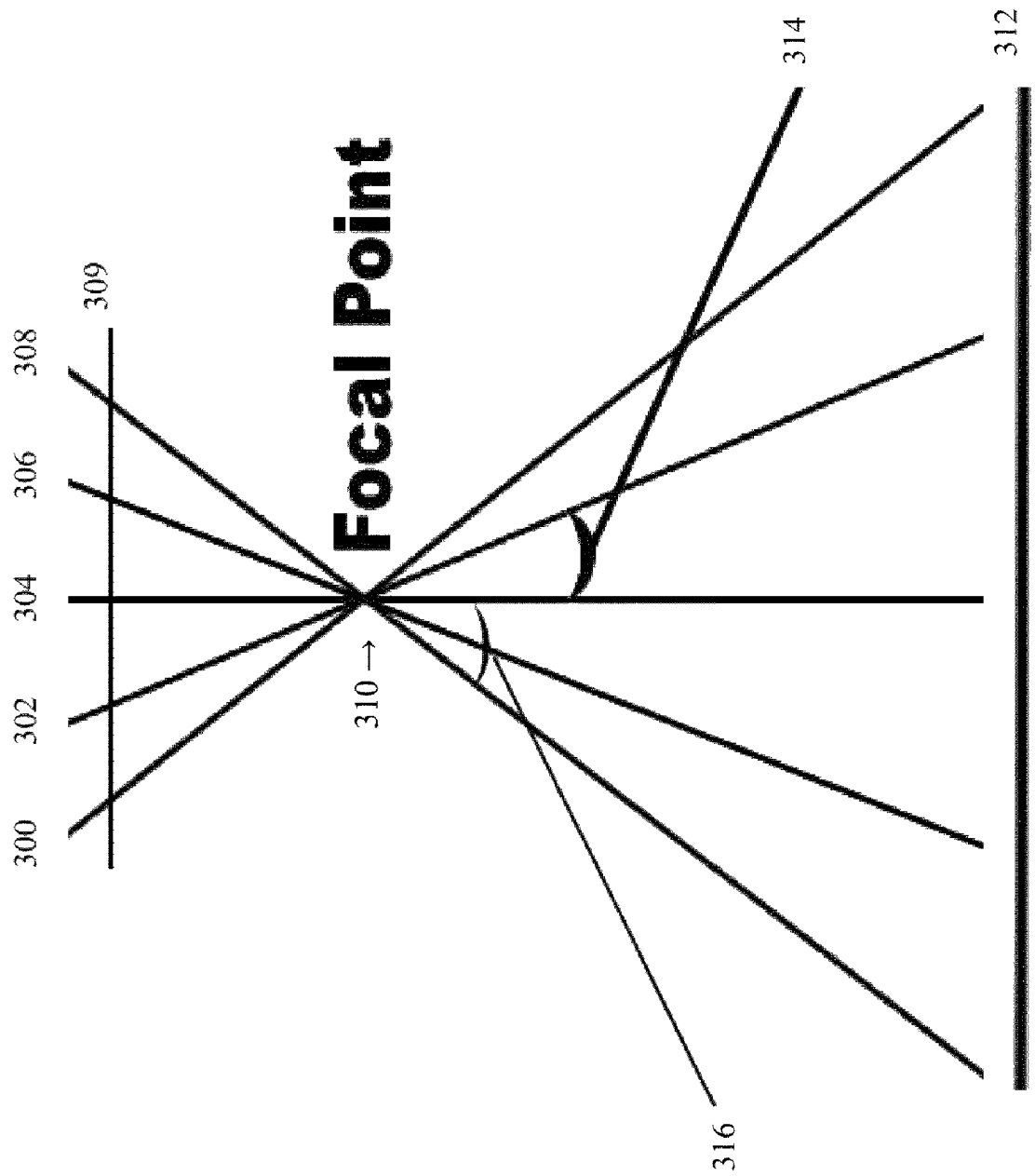
FIG. 3 depicts an imaging pattern illustrating certain aspects of the present invention.

The present invention addresses this with an anti-vignetting function, illustrated in reference now to FIG. 3. A number of focal columns 300, 302, 304, 306 and 308 converge from image plane 309 and cross through focal point 310 as they range across imaging target area 312 (e.g., ground terrain). Columns 300-308 may comprise individual resolution columns of a single camera or sensor, or may represent the focal axes of a number of independent cameras or sensors. For reference purposes, column 304 serves as the axis and point 313 at which column 304 intersects image plane 309 serves as a principal point. The exposure control module applies an anti-vignetting function—multiplying the original intensity of an input pixel with a coordinate-dependent anti-vignetting factor. Because the receiving surface is represented as a plane with a coordinate system, each column will have a number of resolution rows (not shown). This relationship may be expressed, for a pixel p at column x and row y, as follows:

$$<\text{adjusted intensity}>=<\text{original intensity}>*f(x);$$

where $f(x)$ is a function of the form:

$$f(x)=\cos(\text{off-axis angle})^4.$$

The off-axis angle 314 is computed by the formula:

$$\text{off-axis angle}=\arctan(pP/\text{focal-length})$$

where pP is the distance from point p(x, y) to principal point P(xP, yP), or:

$$pP=\sqrt{((x-xP)^2+(y-yP)^2)}$$

Each set of input images needs to be stitched into a mosaic image. Even though the exposure control module regulates the amount of light each camera or sensor receives, the resulting input images may still differ in intensity. The present invention provides an intensity-balancing module that compares overlapping area between adjacent input images, to further balance the relative intensities. Because adjoining input images are taken simultaneously, the overlapping areas should, in theory, have identical intensity in both input images. However, due to various factors, the intensity values are usually not the same. Some such factors causing intensity difference could include, for example, the exposure control module being biased by unusually bright or dark objects present in the field of view of only a particular camera, or the boresight angles of cameras being different (i.e., cameras that are more slanted receive less light than those more vertical).

To balance two adjacent images, one is chosen as the reference image and the other is the secondary image. A correlation matrix C is determined using, for example, the following process. Let V be a 3×1 vector representing the values (R, G and B) of a pixel:

$$V = \begin{matrix} R \\ G \\ B. \end{matrix}$$

A correlation matrix C may be derived as:

$$C = \begin{matrix} FR & 0 & 0 \\ 0 & FG & 0 \\ 0 & 0 & FB; \end{matrix}$$

where FR=AvgIr/AvgIn; AvgIr=Red average intensity of overlapped region in reference image; AvgIn=Red average intensity of overlapped region in new image; and FG and FB are similarly derived.

The correlation matrix scales pixel values of the secondary image so that the average intensity of the overlapping area of the secondary image becomes identical to the average intensity of the overlapping area of the reference image. The second image can be balanced to the reference image by multiplying its pixel values by the correlation matrix.

Thus, in one embodiment of a balancing process according to the present invention, a center image is considered the reference image. The reference image is first copied to the compound image (or mosaic). Overlapping areas between the reference image and an adjoining image (e.g., the near left image) are correlated to compute a balancing correlation matrix (BCM). The BCM will be multiplied with vectors representing pixels of the adjoining image to make the intensity of the overlapping area identical in both images. One embodiment of this relationship may be expressed as:

Let $I$(center)=Average intensity of overlapping area in center image;

$I$(adjoining)=Average intensity of overlap in adjoining image; then

Balancing factor=$I$(center)/$I$(adjoining).

The balancing factor for each color channel (i.e., red, green and blue) is independently computed. These three values form the diagonal of the BCM, with the other elements being zeros. The now-balanced adjoining image is copied to the mosaic. Smooth transitioning at the border of the copied image is providing by "feathering" with a mask. This mask has the same dimension as the adjoining image and comprises a number of elements. Each element in the mask indicates the weight of the corresponding adjoining image pixel in the mosaic. The weight is zero for pixels at the boundary (i.e. the output value is taken from the reference image), and increases gradually in the direction of the adjoining image until it becomes unity—after a chosen blending width has been reached. Beyond the blending area, the mosaic will be entirely determined by the pixels of the adjoining image. Similarly, the overlaps between all the other constituent input images are analyzed and processed to compute the correlation matrix and to balance the intensities of the images.

Figure 4:
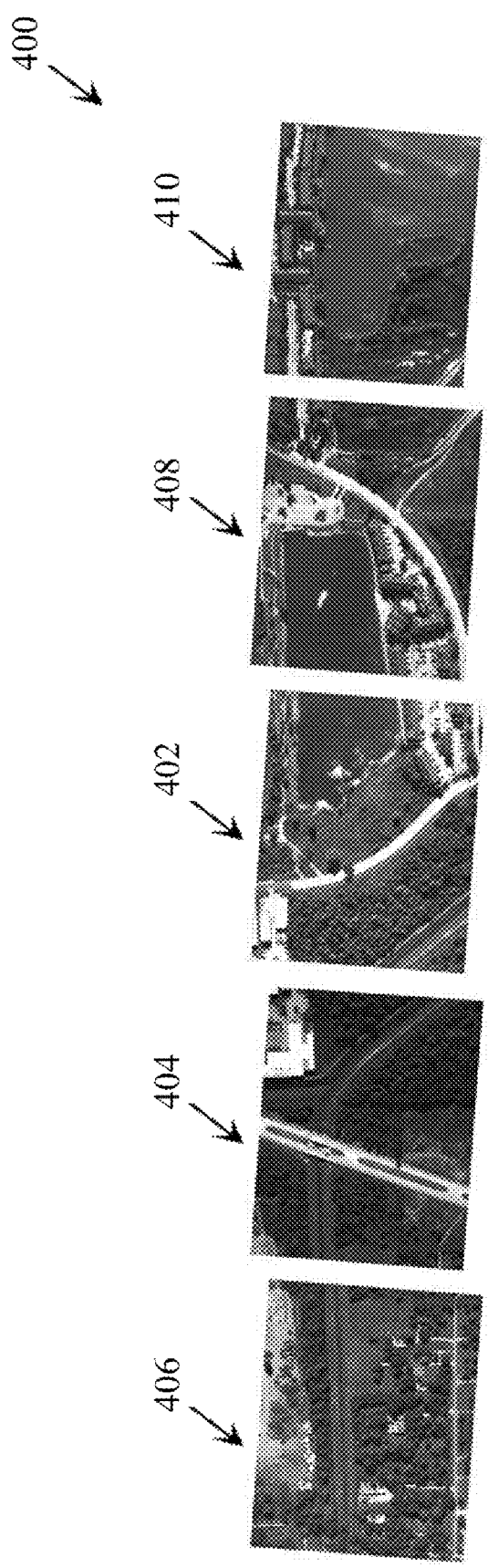
FIG. 4 illustrates an array of images retrieved in accordance with the present invention.
Figure 5:
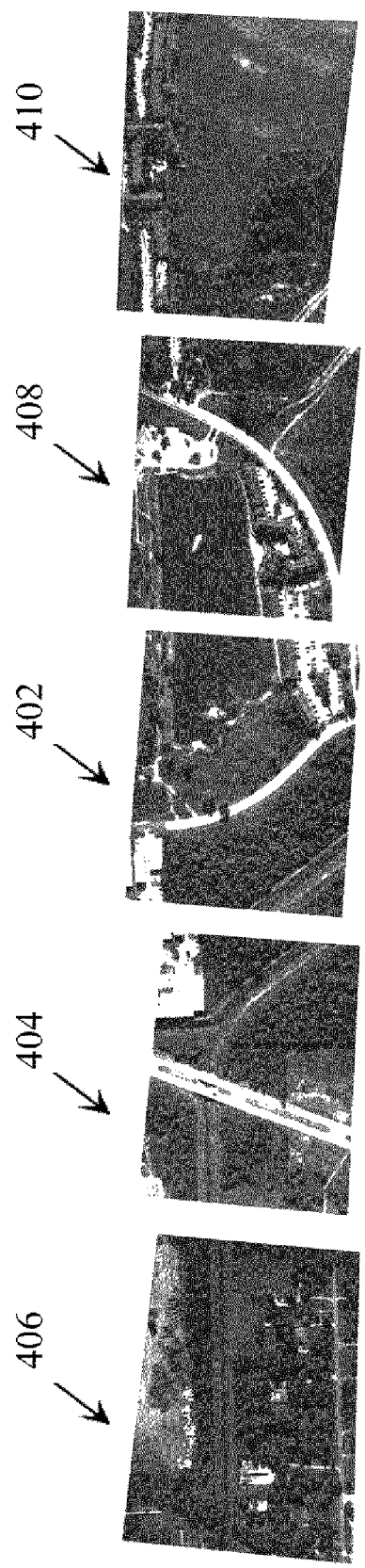
FIG. 5 illustrates an array of images processed in accordance with the present invention.
Figure 6:
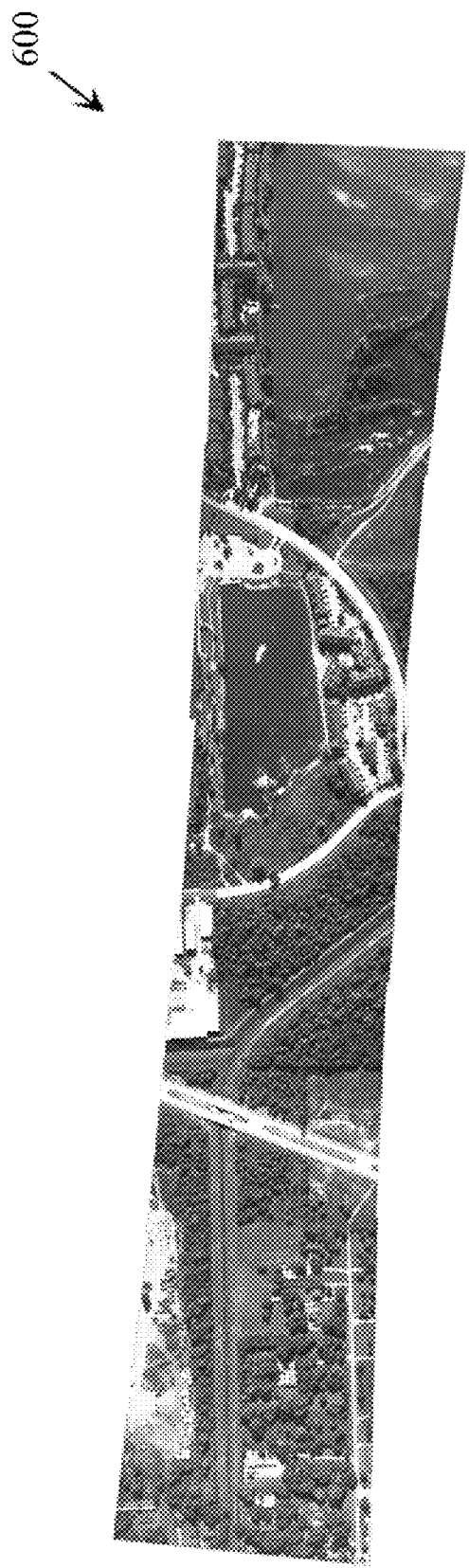
FIG. 6 illustrates an image mosaic in accordance with the present invention.

Referring now to FIGS. 4-6, an example of mosaicing in accordance with the present invention is illustrated. A series 400 of raw input images collected by camera array 100 is depicted. Series 400 comprises center image 402, near left image 404, far left image 406, near right image 408, and far right image 410. Raw input images 402-410 are typically of the same size and shape. FIG. 5 illustrates images 402-410 after orthorectification, which may adjust the size and shape of the images based on relative camera positions, angles, etc. FIG. 6 depicts a resulting image mosaic 600 after images 402-410 have been stitched or mosaiced together in accordance with the present invention.

Once mosaics similar to mosaic 600 have been generated, they too can be mosaiced together to form larger mosaic images representative of particular flight lines ("strips"). Initially, a mosaic image at one end of a flight line is imaged to a strip. Then, the next sequential mosaic along the flight line is imaged to the strip. However, to avoid a visible seam at the border between the two mosaics, the imaging involves more than a mere overlaying operation. In a fashion similar to the initial generation of a mosaic, a correlation matrix for the new input mosaic is computed by correlating average intensities in the overlap between input mosaics. Unlike the initial generation of the mosaics, however, this matrix is not used to modify pixel intensity of the entire new strip. Instead, its initial values are only used on pixels at borders. Then non-zero matrix elements are increased or decreased gradually to unity for pixels farther away from the border. When a certain transitioning distance has been reached, the matrix elements become unity and the pixels are no longer modified. Thus, a gradient is created in the transitioning area starting at the border and ending at a certain distance from the border. Beyond the transitioning area, the new mosaic is imaged to the strip without modification to pixel values.

Figure 7:
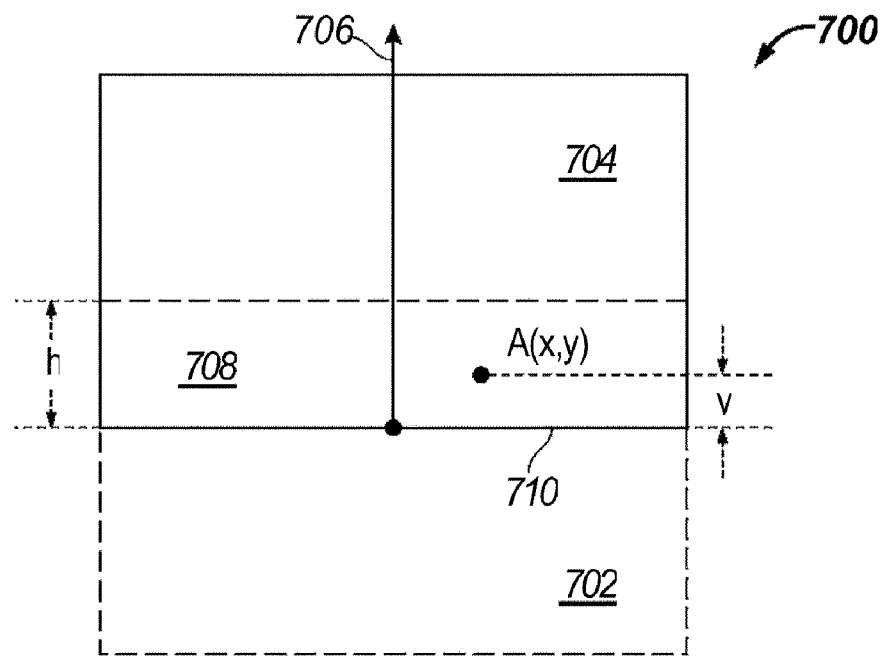
FIG. 7 illustrates an image strip in accordance with the present invention.

A correlation matrix is determined using, for example, the following process and reference to FIG. 7. FIG. 7 depicts a strip 700 being formed in accordance with the present invention. A base mosaic 702 and a new mosaic 704, added along path (or track) 706, overlap each other in region 708. Let V be a vector that represents the R, G and B values of a pixel:

$$V = \begin{array}{c} R \\ G \\ B \end{array}$$

Let h be the transition width of region 708, and y be the along-track 706 distance from the boundary 710 of the overlapped region to a point A, whose pixel values are represented by V.

Let C be the correlation matrix:

$$C = \begin{array}{ccc} FR & 0 & 0 \\ 0 & FG & 0 \\ 0 & 0 & FB \end{array}$$

The balanced value of V, called V' is:

$V'=[y/h.I+(1-y/h).C]\times V$, for $0<y<h$;

$V'=V$, for $y>=h$;

Where I is the identity matrix $$I = \begin{array}{ccc} 1 & 0 & 0 \\ 0 & 1 & 0 \\ 0 & 0 & 1. \end{array}$$

Note that the "feathering" technique is also used in combination with the gradient to minimize seam visibility.

When mosaics are long, differences in intensity at the overlap may change from one end of the mosaic to the other. Computing a single correlation matrix to avoid creating visible seams may not be possible. The mosaic can be divided into a number of segments corresponding to the position of the original input images 402-410 that make up the mosaic. The process described above is applied to each segment separately to provide better local color consistency.

Under this refined algorithm, pixels at the border of two segments may create vertical seams (assuming north-south flight lines). To avoid this problem, balancing factors for pixels in this area have to be "transitioned" from that of one segment to the other. This is explained now with reference to FIG. 8.

Figure 8:
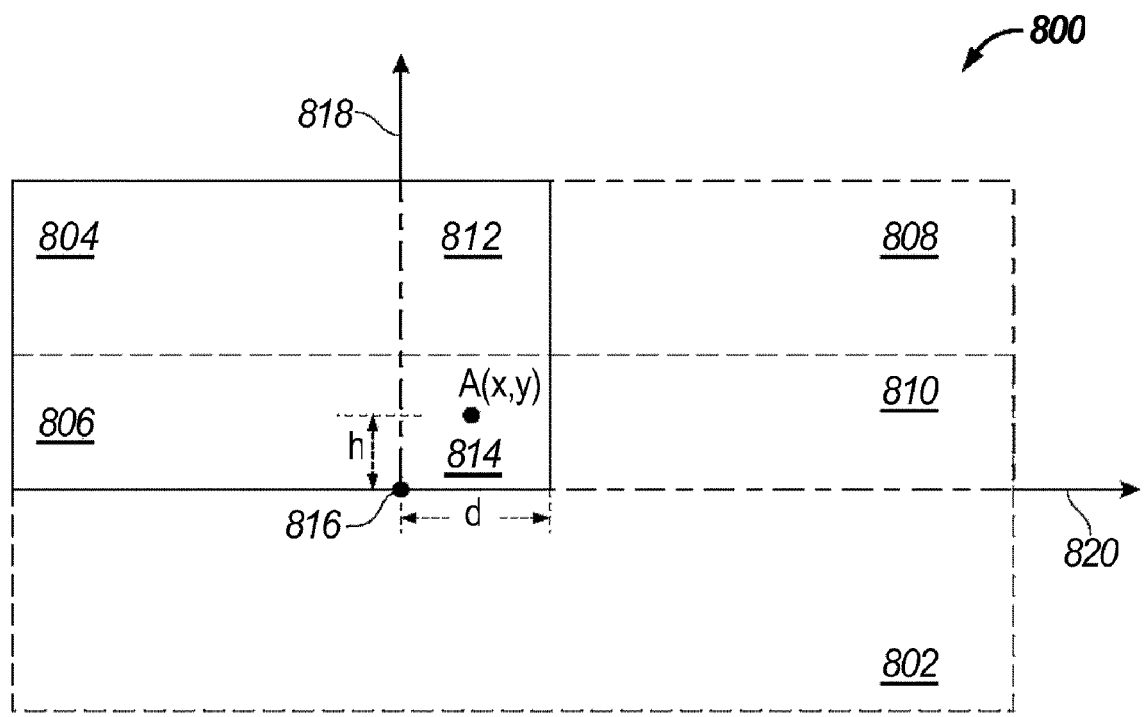
FIG. 8 illustrates another embodiment of an image strip in accordance with the present invention.

FIG. 8 depicts a strip 800 being formed in accordance with the present invention. A base mosaic 802 and a new segment 804 overlap in area 806. Mosaic 802 and another new segment 808 overlap in area 810. Segments 804 and 808 overlap in area 812, and areas 806, 810 and 812 all overlap and coincide at area 814. For explanation purposes, point 816 serves as an origin for y-axis 818 and x-axis 820. Movement along y-axis 818 represents movement along the flight path of the imaging system. Point 816 is located at the lower left of area 814.

According to the present invention, the dimensions of a strip are determined by the minimum and maximum x and y values of the constituent mosaics. An output strip is initialized to a background color. A first mosaic is transferred to the strip. The next mosaic (along the flight path) is processed next. Intensity values of the overlapping areas of the new mosaic and the first mosaic are correlated, separately for each color channel. The new mosaic is divided into a number of segments corresponding to the original input images that made up the mosaic (e.g., segments corresponding to the position of input images 402-410). A mask matrix, comprising a number of mask elements, is created for the new mosaic. A mask element contains the correlation matrix for a corresponding pixel in the new mosaic. All elements in the mask are initialized to unity. The size of the mask can be limited to just the transition area of the new mosaic. The correlation matrix is calculated for the center segment. The mask area corresponding to the center segment is processed. The values of the elements at the edge of the overlap area are set to the correlation matrix. Then, gradually moving away from the first mosaic along the strip, the elements of the correlation matrix are either increased or decreased (whether they are less or more than unity, respectively) until they become unity at a predetermined transition distance. The area of the mask corresponding to a segment adjoining the center segment is then processed similarly. However, the area 814 formed by the first mosaic and the center and adjoining segments of the new image requires special treatment. Because the correlation matrix for the adjoining segment may not be identical to that of the center segment, a seam may appear at the border of the two segments in the overlap area 814 with the first mosaic. Therefore, the corner is influenced by the correlation matrices from both segments. For a mask cell A at distance x to the border with the center segment and distance y to the overlap edge, its correlation matrix is the distance-weighted average of the two segments, evaluated as follows:

For pixel A(x, y) in area 814 at distance x to the border with the center segment, its balanced values are computed as the distance-weighted averages of the values computed using the two segments;
V1 is the balanced RGB vector based on segment 804;
V2 is the balanced RGB vector based on segment 808;
V' is the combined (final) balanced RGB vector $V'=((d-x)/d)\cdot V1+(x/d)\cdot V2;$ Where
x-axis is the line going through bottom of overlapped region;
y-axis is the line going through the left side of the overlapped region between segments 804 and 808;
h is the transition width; and
d is the width of the overlapped region between segments 804 and 808.

The mask areas corresponding to other adjoining segments are computed similarly.

Further according to the present invention, a color fidelity (i.e., white-balance) filter is applied. This multiplies R and B components with a determinable factor to enhance color fidelity. The factor may be determined by calibrating the cameras and lenses. The color fidelity filter ensures that the colors in an image retain their fidelity, as perceived directly by the human eye. Within the image capture apparatus, the Red, Green and Blue light receiving elements may have different sensitivities to the color they are supposed to capture. A "while-balance" process is applied—where image of a white object is captured. Theoretically, pixels in the image of that white object should have equivalent R, G and B values. In reality, however, due to different sensitivities and other factors, the average color values for each R, G and B may be avgR, avgG and avgB, respectively. To equalize the color components, the R, G and B values of the pixels are multiplied by the following ratios:

R values are multiplied by the ratio avgG/avgR; and
B values are multiplied by the ratio avgG/avgB.

The end result is that the image of the white object is set to have equal R G B components.

In most applications, a strip usually covers a large area of non-water surface. Thus, average intensity for the strip is unlikely to be skewed by anomalies such as highly reflecting surfaces. The present invention provides an intensity normalization module that normalizes the average intensity of each strip so that the mean and standard deviation are of a desired value. For example, a mean of 127 is the norm in photogrammetry. A standard deviation of 51 helps to spread the intensity value over an optimal range for visual perception of image features. Each strip may have been taken in different lighting conditions and, therefore, may have different imaging data profiles (i.e., mean intensity and standard deviation). This module normalizes the strips, such that all have the same mean and standard deviation. This enables the strips to be stitched together without visible seams.

This intensity normalization comprises a computation of the mean intensity for each channel R, G and B, and for all channels. The overall standard deviation is then computed. Each R, G and B value of each pixel is transformed to the new mean and standard deviation:

new value=new mean+(old value−old mean)*(new std/old std).

Figure 9:
FIG. 9 illustrates an image tile in accordance with the present invention.
Figure 10:
FIG. 10 illustrates a finished image tile in accordance with the present invention.

Next, multiple adjacent strips are combined to produce tiled mosaics for an area of interest. This is illustrated in FIGS. 9-10. In FIG. 9, a rough tile 900 is illustrated, formed by stitching together adjacent strips 902-912. Tile 900 undergoes rectification and normalization in accordance with the present invention, resulting in finished tile 1000 as illustrated in FIG. 10. Finished tiles can correspond to the USGS quads or quarter-quads. Stitching strips into mosaics is similar to stitching mosaics together to generate strips, with strips now taking the role of the mosaics. At the seam line between two strips, problems may arise if the line crosses elevated structures such as buildings, bridges, etc. This classic problem in photogrammetry arises from the parallax caused by the same object being looked at from two different perspectives. During imaging of a building, for example, one strip may present a view from one side of the building while another strip presents a view from another side of the building. After the images are stitched together, the resulting mosaic may look like a tepee. In order to address this, an elevation-guided mosaicing process may be implemented to guide the placement of a seam line. This requires having the DEM data (such as those derived from LIDAR data collected concurrently with image data), so that the seam line can be created as a series of line segments traversing points with ground elevation. Thus, in some mosaiced images, a seam line may not be a straight line—instead comprising a seam line that shifts back and forth to avoid elevated structures.

Figure 11:
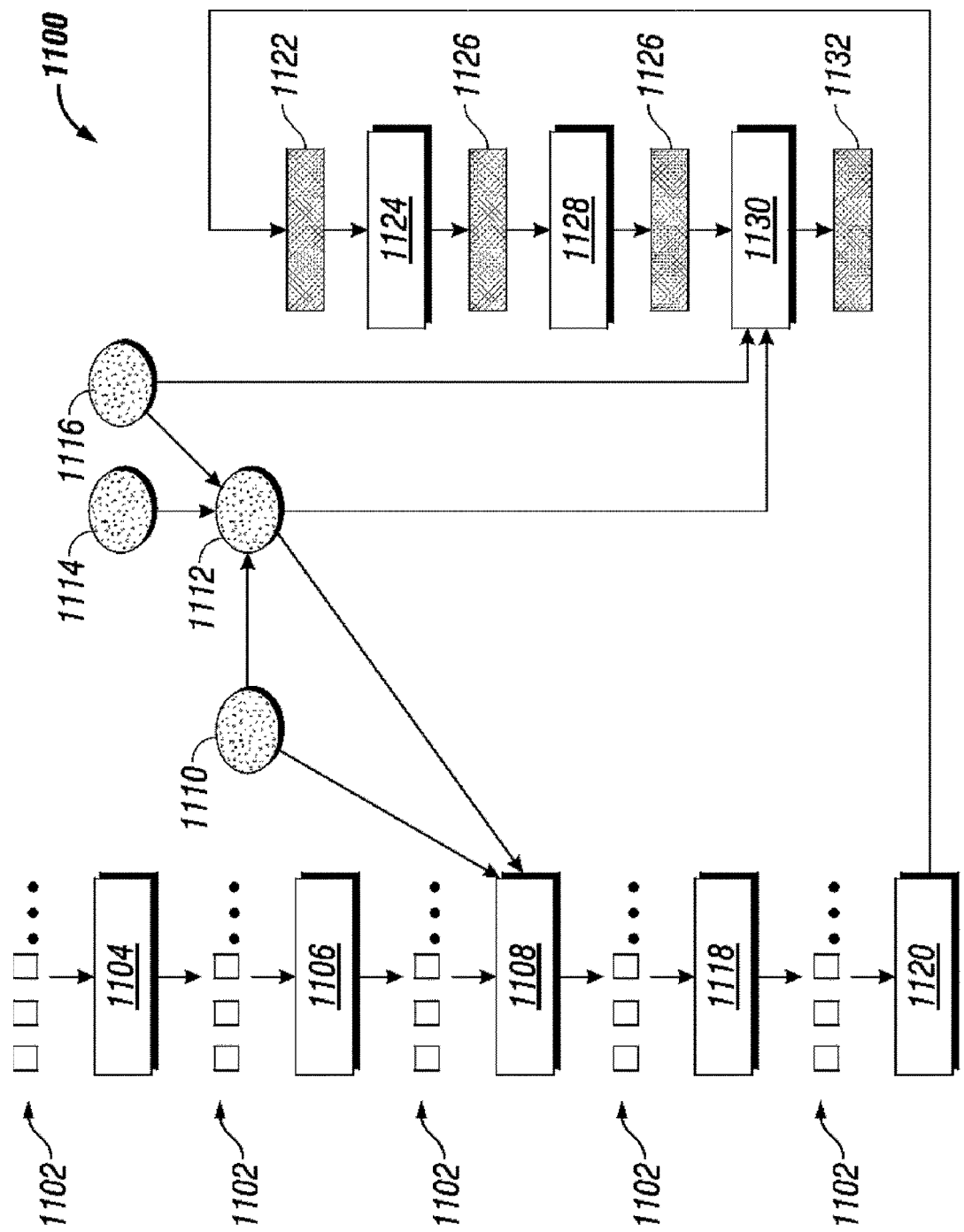
FIG. 11 illustrates one embodiment of an imaging process in accordance with the present invention.

Referring now to FIG. 11, one embodiment of an imaging process 1100 is illustrated in accordance with the present invention as described above. Process 1100 begins with a series 1102 of one, or more, raw collected images (e.g., images 126, 128, 132, 136 and 140 of FIG. 2). Initial processing then begins as images 1102 are then processed through a white-balancing process 1104, transforming them into a series of intermediate images. Series 1102 is then processed through anti-vignetting function 1106. Initial processing is now completed, and series 1102 progresses to orthorectification process 1108. As previously noted, orthorectification may rely on position and attitude data 1110 from the imaging sensor system or platform, and on DEM data 1112. DEM data 1112 may be developed from position data 1110 and from, for example, USGS DEM data 1114 or LIDAR data 1116. Series 1102 is now orthorectified, as illustrated in reference to FIG. 5, and processing continues with color balancing 1118. After color balancing, series 1102 is converted by mosaicing module 1120 into compound image 1122. Module 1120 performs the mosaicing and feathering processes during this conversion. Now, one or more compound images 1122 are further combined in step 1124, by mosaicing with a gradient and feathering, into image strip 1126. Image strips are processed through intensity normalization 1128. The now normalized strips 1128 are mosaiced together in step 1130, again by mosaicing with a gradient and feathering, rendering a finishing tiled mosaic 1132. The mosaicing performed in step 1130 may comprise an elevation-guided mosaicing, relying on DEM data 1112 and LIDAR data 1116.

The modules, algorithms and processes described above can be implemented in a number of technologies and configurations. Embodiments of the present invention may comprise functional instances of software or hardware, or combinations thereof. Furthermore, the modules and processes of the present invention may be combined together in a single functional instance (e.g., one software program), or may comprise operatively associated separate functional devices (e.g., multiple networked processor/memory blocks). All such implementations are comprehended by the present invention.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of mosaicing two overlapping digital input images together to form an output image, comprising the steps of:
   providing a reference image, comprising a number of green-dominant pixels having certain average color intensity and average elevation;
   providing a secondary image, comprising a number of green-dominant pixels having certain average color intensity and average elevation, that overlaps the reference image in an overlap area;
   scaling pixel values of the secondary image within the overlap area such that the color intensity of the secondary image green-dominant pixels within the overlap area is equivalent to the average color intensity of the reference image green-dominant pixels within the overlap area;
   selecting an initial seam line within the overlap area;
   determining a position of an elevated feature in a small segment of the overlapping area from a digital elevation model; and
   establishing the seam line within the overlap area, wherein the route of the seam line is altered based upon the position of an elevated feature.

2. The method of claim 1, further comprising a blending process for smoothing image transition within the overlap area.

3. The method of claim 2, wherein the blending process assigns a relative weight, determinative of inclusion in the output image, to the pixels of the secondary image.

4. The method of claim 3, wherein the relative weight ranges between zero, indicating no inclusion, and unity, indicating full inclusion.

* * * * *